US010462983B2

(12) United States Patent
Socolsky et al.

(10) Patent No.: US 10,462,983 B2
(45) Date of Patent: Nov. 5, 2019

(54) DRIP EMITTER HAVING HINGED FLAP WITH UPSTANDING CLOSING PINS (71) Applicant: Netafim, Ltd., Tel Aviv (IL)

(72) Inventors: Esteban Socolsky, Kibbutz Hatzerim (IL); Ron Keren, Kibbutz Hatzerim (IL)

(73) Assignee: Netafim, Ltd., Tel Aviv (IL)

( * ) Notice: Subject to any disclaimer, the term of this patent is extended or adjusted under 35 U.S.C. 154(b) by 0 days.

(21) Appl. No.: 15/840,213

(22) Filed: Dec. 13, 2017

(65) Prior Publication Data

US 2018/0098514 A1  Apr. 12, 2018

Related U.S. Application Data (63) Continuation-in-part of application No. PCT/IB2016/057170, filed on Nov. 28, 2016.

(60) Provisional application No. 62/262,401, filed on Dec. 3, 2015.

(51) Int. Cl.
*A01G 25/02* (2006.01)
(52) U.S. Cl.
CPC .................. *A01G 25/023* (2013.01)
(58) Field of Classification Search
CPC .................................... A01G 25/023
USPC ........................................... 239/542
See application file for complete search history.

(56) References Cited

U.S. PATENT DOCUMENTS

| 3,998,391 | A | 12/1976 | Lemelshtrich |
| 4,817,875 | A | 4/1989 | Karmeli et al. |
| 5,203,503 | A | 4/1993 | Cohen |
| 5,279,462 | A | 1/1994 | Mehoudar |
| 5,294,058 | A | 3/1994 | Einav |
| 5,591,293 | A | 1/1997 | Miller et al. |
| 6,027,048 | A | 2/2000 | Mehoudar |
| 6,039,270 | A | 3/2000 | Dermitzakis |
| 6,179,949 | B1 | 1/2001 | Buluschek |
| 6,250,571 | B1 | 6/2001 | Cohen |
| 6,464,152 | B1 | 10/2002 | Bolinis et al. |
| 6,568,607 | B2 | 5/2003 | Boswell et al. |
| 8,051,871 | B2 | 11/2011 | Shani et al. |
| 8,317,111 | B2 | 11/2012 | Cohen |
| 9,386,752 | B2 | 7/2016 | Einav |
| 9,943,045 | B2 * | 4/2018 | Kidachi ............... A01G 25/023 |
| 2002/0133910 | A1 | 9/2002 | Ekron |
| 2002/0166907 | A1 | 11/2002 | Boswell et al. |
| 2012/0199673 | A1 | 8/2012 | Cohen |
| 2014/0246520 | A1 | 9/2014 | Einav |
| 2015/0150199 | A1 | 6/2015 | Kidachi |
| 2016/0295816 | A1 | 10/2016 | Kidachi |
| 2017/0035005 | A1 | 2/2017 | Kidachi |

FOREIGN PATENT DOCUMENTS

| ES | 1062385 | 6/2006 |
| WO | WO 2012/137200 | 10/2012 |

OTHER PUBLICATIONS

International Search Report dated Mar. 2, 2016, in counterpart International (PCT) Application No. PCT/IB2016/057170.

* cited by examiner

*Primary Examiner* — Christopher S Kim
(74) *Attorney, Agent, or Firm* — Womble Bond Dickinson (US) LLP (57) ABSTRACT

A drip emitter includes a frame, that can be made of plastic, and a membrane, that can be elastomeric; and both the frame and the membrane are formed by injection molding and are attached to each other.

36 Claims, 7 Drawing Sheets

DRIP EMITTER HAVING HINGED FLAP WITH UPSTANDING CLOSING PINS

RELATED APPLICATIONS

This is a bypass continuation-in-part of PCT/IB2016/057170, filed Nov. 28, 2016, and published as WO 2017/093882 A1, which claims priority to U.S. Provisional Patent Application No. 62/262,401, filed Dec. 3, 2015. The contents of the aforementioned applications are incorporated by reference in their entirety.

TECHNICAL FIELD

Embodiments of the invention relate to drip emitters typically for use in irrigation.

BACKGROUND

Membranes can be used for various purposes in irrigation drip emitters in connection to waterways formed in the emitter. For example, a membrane may be used for controlling the flow rate of water discharged by the emitter, for sealing between parts of the emitter, for defining valves in the emitter and/or for defining flow-paths within the emitter.

In control of flow rate, for example, the membrane operates to control liquid flow out of the emitter so that it is substantially independent of pressure at an inlet of the emitter for a range of pressures typically encountered in irrigation applications. For this purpose, the membrane is normally located between inlet and outlet waterways of the emitter and in response to increase in pressure of the entering water undergoes distortion that operates to increase resistance to liquid flow through and out of the emitter.

U.S. Pat. No. 4,210,287 discloses an emitter unit provided with a resiliently flexible membrane, which is releasably retained within a body member so as to serve a double function. On the one hand, whilst being exposed to the irrigation flow pressure in the conduit to serve in exercising differential pressure control, and, on the other hand, to define, with respect to a flow restricting waterway groove formed in the body member, a flow-restricting waterway flow-path.

Provision of drip emitters that are less expensive is desirable and one way of providing same may be to design a drip emitter from a single part, which thus requires less of substantially no assembly steps to be completed for use. In particular, provision of such a single part drip emitter may be beneficial in drip emitters that are made from different type materials, such as pressure regulated drip emitters that typically include a plastic body and an elastic membrane for assisting in the pressure regulation.

SUMMARY

The following embodiments and aspects thereof are described and illustrated in conjunction with systems, tools and methods which are meant to be exemplary and illustrative, not limiting in scope.

In an embodiment there is provided a drip emitter comprising a frame, preferably a plastic frame, and a membrane, preferably an elastomeric membrane, both formed by injection molding, wherein the frame and membrane being attached to each other. The membrane may equally be referred to also as a diaphragm.

Typically, the frame defines an opening and the membrane is located within the opening.

Further typically, the drip emitter body comprises a recess, wherein the membrane is configured to overlay the recess to form therewith a pressure regulating chamber of the emitter in an operative assembled state of the emitter.

Thus, embodiments of the emitter are formed with an internal recess like formation functioning as a pressure regulating chamber that besides small pathways leading into and out of the chamber, is substantially closed to the exterior of the emitter. The membrane typically closes one side of the chamber in an assembled state of the emitter, and can be moved, possibly about a hinge, to close the chamber.

In addition to the exemplary aspects and embodiments described above, further aspects and embodiments will become apparent by reference to the figures and by study of the following detailed descriptions.

Additional aspects of the present invention can be described with reference to the following paragraphs:

Paragraph 1—A drip emitter comprising an emitter body; a flap comprising a frame connected to the emitter body via a hinge, the frame having a frame periphery and comprising a first material; a membrane attached to the frame, the membrane formed from second material different from the first material; wherein: the frame and membrane are configured to cover at least a portion of the emitter body, when the emitter is in an operative assembled state.

Paragraph 2—The drip emitter according to paragraph 1, wherein the frame defines an opening and the membrane is located within the opening.

Paragraph 3—The drip emitter according to any one of paragraphs 1 to 2, wherein one of the frame and the membrane comprises one or more undercut structures, and the other of the frame and the membrane comprises one or more portions engaged to the one or more undercut structures, to attach the membrane to the frame.

Paragraph 4—The drip emitter according to any one of paragraphs 1 to 3, wherein the membrane is attached to the frame by chemical crosslinking.

Paragraph 5—The drip emitter according to any one of paragraphs 1 to 4, wherein the emitter body comprises a recess; and the membrane is configured to overlay the recess to form therewith a pressure regulating chamber of the emitter, in the operative assembled state of the emitter.

Paragraph 6—The drip emitter according to any one of paragraphs 1 to 5, wherein the hinge is a living hinge which is formed of the same material as the frame and the emitter body.

Paragraph 7—The drip emitter according to any one of paragraphs 1 to 6, wherein the emitter body and frame both are formed of the first material; and the membrane is formed of the second material which is different from the first material.

Paragraph 8—The drip emitter according to any one of paragraphs 1 to 7, wherein the emitter body and frame are formed from polyethylene and the membrane is formed from a thermoplastic elastomer.

Paragraph 9—The drip emitter according to any one of paragraphs 1 to 8, wherein the frame comprises a periphery bounding and surrounding the membrane; and the periphery comprises bays formed as indentations in an otherwise smooth periphery.

Paragraph 10—The drip emitter according to any one of paragraphs 1 to 9, wherein the frame comprises a periphery bounding and surrounding the membrane; the membrane comprises a regulating part configured to overlay a regulating chamber of the emitter in the operative assembled state of the emitter; and an area A1 of the regulating part and an area A2 of the membrane bound within the periphery satisfies a relation of $0.7 \leq A1/A2 \leq 0.95$.

Paragraph 11—A method of forming a drip emitter comprising an injection molded frame having an injection molded membrane attached thereto, the method comprising: providing a mold; in one injection molding step, injecting the first material into the mold to form the frame of the emitter; and in another injection molding step, injecting the second material into the mold to form the membrane of the emitter such that the membrane and frame are attached to one another.

Paragraph 12—The method according to paragraph 11, comprising forming the emitter body at the same time as the frame, in said one injection molding step, such that the frame is rotatably attached to the emitter body.

Paragraph 13—The method according to any one of paragraphs 11 to 12, wherein the second material is more elastic than the first material.

Paragraph 14—The method according to any one of paragraphs 11 to 13, wherein the first material is polyethylene and the second material is a thermoplastic elastomer.

Paragraph 15—The method according to any one of paragraphs 11 to 14, wherein the first material is injected before the second material.

Paragraph 16—The method according to any one of paragraphs 11 to 14, wherein the second material is injected before the first material.

BRIEF DESCRIPTION OF THE FIGURES

Exemplary embodiments are illustrated in referenced figures. It is intended that the embodiments and figures disclosed herein are to be considered illustrative, rather than restrictive. The invention, however, both as to organization and method of operation, together with objects, features, and advantages thereof, may best be understood by reference to the following detailed description when read with the accompanying figures, in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Figure 1A:
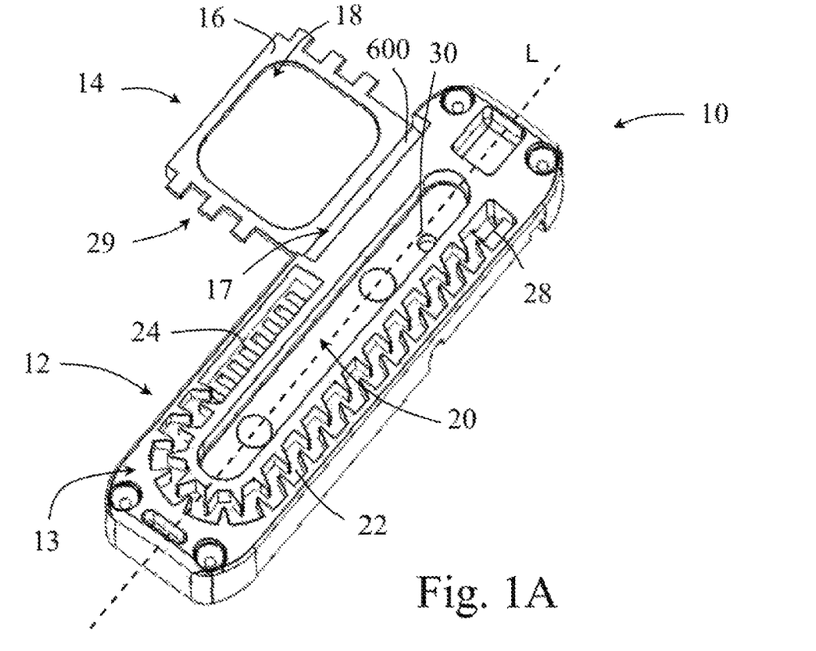
FIGS. 1A and 1B schematically show, respectively, perspective top and bottom views of a drip emitter in accordance with an embodiment of the present invention.
Figure 1B:
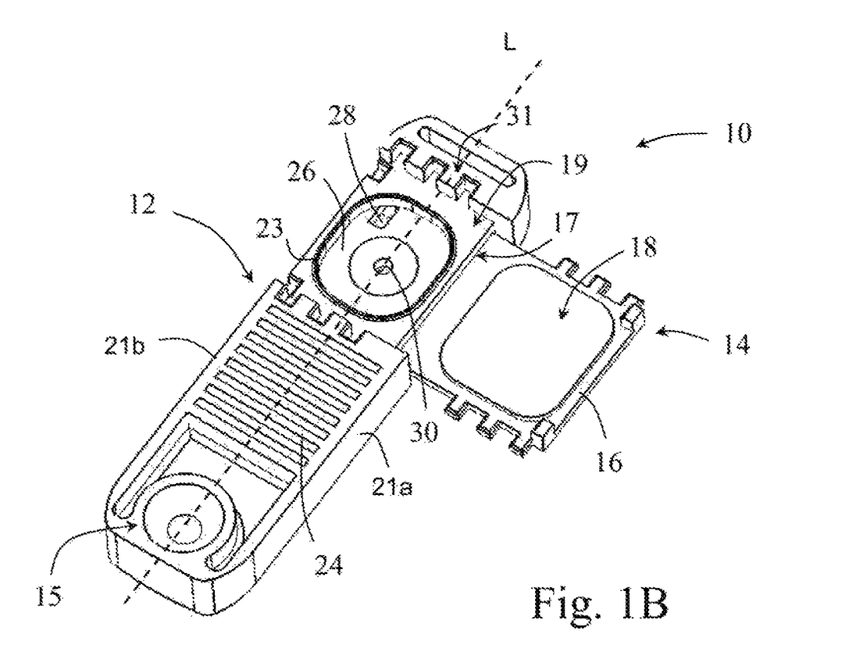
Figure 6:
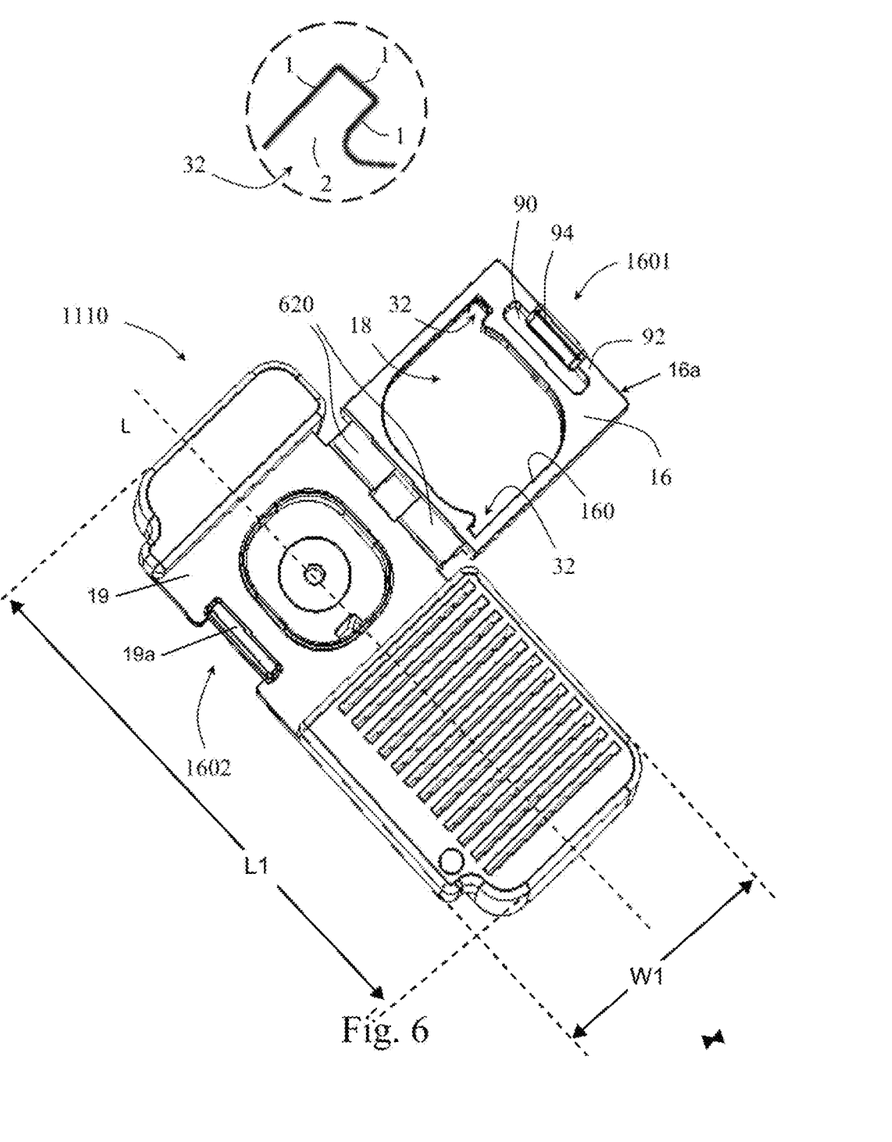
FIGS. 6 and 6A schematically show, respectively, perspective bottom and side views of a drip emitter in accordance with another embodiment of the present invention in a non-final assembled state.

Attention is first drawn to FIGS. 1A and 1B showing an embodiment of a drip emitter 10 including a body 12 and a flap 14 that is movable with respect to the body about a hinge 17. The emitter has a longitudinal axis L which also serves as the longitudinal axis of the emitter body 12. As best seen in FIG. 6, the drip emitter has a length L1 which extends along the longitudinal axis L and a width W1 which extends perpendicular to the longitudinal axis L. As also seen in FIG. 6, the flap 14 extends only part-way along the drip emitter's length L1. Body 12 may be formed by injection molding from Polyolefin materials typically used in production of drip emitters, such as preferably Polyethylene (PE). Flap 14 may include a frame 16 formed possibly from similar, preferably identical, material as body 12, and possibly molded together with body 12 during its production to optionally form hinge 17 as a living hinge. Hinge 17 may comprise a depression 600 for thinning its thickness to assist in bending of flap 14 relative to body 12. Flap 14 includes alternating projections and recesses 29 along at least portions of an outer periphery of frame 16, which mate with a complementary alternating projections and recesses 31 formed in the frame housing 19 on the inner side 15 of the emitter body 12.

In accordance with an aspect of the invention, emitter 10 may include a diaphragm or membrane 18 located within frame 16. Membrane 18 may preferably be formed within frame 16 during the production of the emitter by injection molding, preferably from a more flexible and/or elastic material than body 12, possibly from a thermoplastic elastomer (TPE). In various embodiments of the invention, the frame may be injected prior to the membrane that is then molded thereupon; or the membrane may be injected prior to the frame that is then molded thereupon, or the frame and membrane may be molded substantially together at the same time.

In accordance with various aspects of the invention, connection and/or attachment between membrane 18 and frame 16 may be facilitated by mechanical means and/or by bonding or chemical crosslinking. In one embodiment, mechanical means may be provided in the frame and/or membrane for assisting in connection between these two parts. Such mechanical means may include geometrical structures possibly in the form of undercut structure(s) for receiving therein portions of membrane or frame, possibly during the injection process. In an embodiment possibly combinable with the former embodiment, bonding or chemical crosslinking between the membrane and frame may be facilitated by choosing respective materials for the membrane and frame suitable for bonding one to the other, typically when heating at least one of the membrane or frame to assume at least a partial melted state.

By way of a non-binding example, an embodiment in which mechanical means may be used for assisting in attachment, may include a frame 16 made of PE and a membrane 18 made of at least one of the materials and/or products: Silicone, Hytrel, Cross linked elastomers, Pebax, Alcryn and/or OnFlex. An embodiment in which bonding or chemical crosslinking may be used for assisting in attachment, may include a frame 16 made of PE and a membrane 18 made of at least one of the materials and/or products: Vistamax, Santoprene, TPO, TPVO, Uniprene, Forprene, Sarlink and/or Nexprene.

With attention drawn back to FIGS. 1A and 1B, the emitter's body is seen including an upper outer side 13 configured to attach preferably by heat bonding to an inner face of an irrigation pipe (not shown). The emitter's outer side 13 typically includes an exit pool 20 in this example shown having an elongated extension, and a labyrinth 22 possibly formed to extend at least partially about exit pool 20.

The emitter's opposing bottom inner side 15 configured to face into the pipe includes an inlet 24, a frame housing 19 and a recess 26. Inlet 24 in this example is shown having an optional filter construction. Frame housing 19 is shown formed in body 12 in the emitter's inner side 15. Frame housing 19 preferably includes lateral sections opening out to both the first and second lateral sides 21a, 21b of the emitter, with the flap's hinge 17 extending along the lateral section associated with the first lateral side 21a. Frame housing 19 additionally includes alternating projections and recesses 31 along at least portions of its periphery for engagement with the projections and recesses 29 of flap 14.

Recess 26 is shown formed in the emitter's body and opening out to the frame housing 19 at a peripheral raised rim 23. Recess 26 is configured to be overlaid by flap 14 in an assembled operative state of the emitter (such state seen in FIGS. 2B, 3B and 3C) to form with the flap's membrane 18 pressed against rim 23 a pressure regulating chamber of the emitter.

Operation of embodiments of the emitter during drip irrigation when preferably attached to an inner side of an irrigation pipe (not shown) may be the following. Liquid entering the emitter via inlet 24 is configured to pass to the emitter's upper outer side 13 to flow downstream via labyrinth 22. Emitter 10 includes a window 28 formed at an end of labyrinth 22 for communicating with recess 26 located at the emitter's lower inner side 15 so that liquid flowing downstream via labyrinth 22 can flow into recess 26.

The liquid flowing via recess 26 is regulated by elastic flexing of membrane 18 into recess 26 due to pressure fluctuations in the pipe. The liquid flows out of recess 26 via an outlet 30 formed possibly substantially at a center of the recess back up to the emitter's upper outer side 13 to arrive in exit pool 20. From the exit pool the liquid then flows to the environment outside of the irrigation pipe via an aperture formed thought the pipe above the exit pool (both pipe and aperture not shown).

Figure 2A:
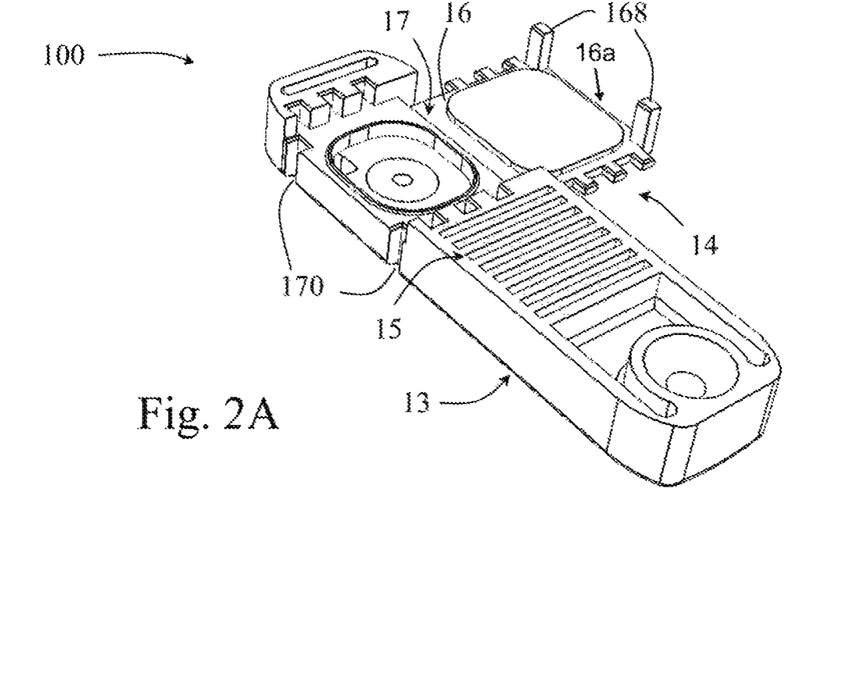
FIGS. 2A and 2B schematically show perspective bottom views of a drip emitter in accordance with another embodiment of the present invention in, respective, non-final and final assembly states.
Figure 2B:
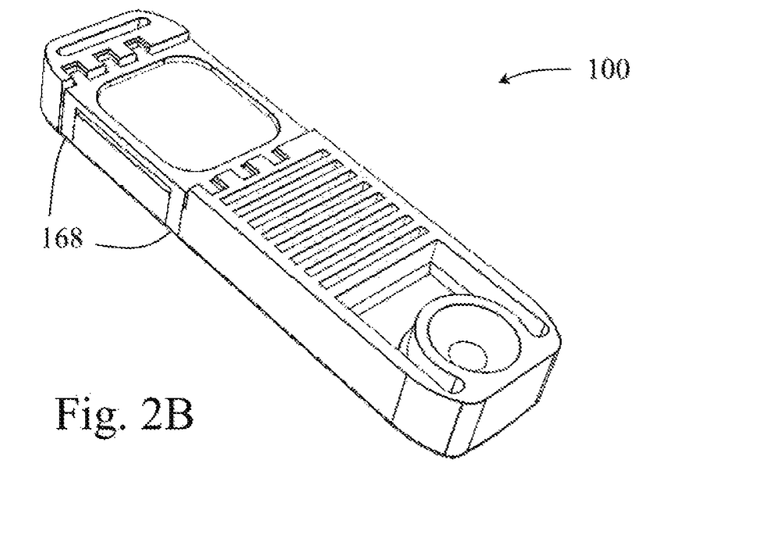

Attention is drawn to FIGS. 2A and 2B showing an embodiment of an emitter 100 having a generally similar construction to emitter 10 and therefore similar parts are likewise numbered. Emitter 100 mainly differs from emitter 10 by including retaining means for retaining the flap 14 to the emitter body 12. The retaining means comprises a first retaining portion on the flap 14 and a second retaining portion on the emitter body 12. Emitter 100 includes in its flap 14, at a periphery of frame 16, two upstanding closing pins 168 which project in a direction perpendicular to the plane of the frame 16. The upstanding closing pins 168 as seen in this example are located at a far side 16a of the frame that is distal to hinge 17. Emitter 100 further includes in this embodiment complementary pin catches 170 in the form of two slits 170 formed through its body 12 that open out to the emitter's upper outer side 13 and to the emitter's lower inner side 15 at the frame housing 19.

Rotation about hinge 17 urges flap 14 (in both emitters 10, 100) to overly recess 26 with the mutual engagement of the complementary structures (29, 31 in emitter 10 or 168, 170 in emitter 100) assisting in retaining the flap in this position. In the embodiment of emitter 100, the upstanding closing pins 168 received within the slits 170 extend each to a respective end that is located possibly flush with the emitter's upper outer side 13. Thus, each such respective end of a closing pin 168 preferably bonds to the pipe during bonding of the emitter to the pipe to thereby assist in retaining flap 14 in its pressed position upon recess 26 during use of the emitter.

Figure 3A:
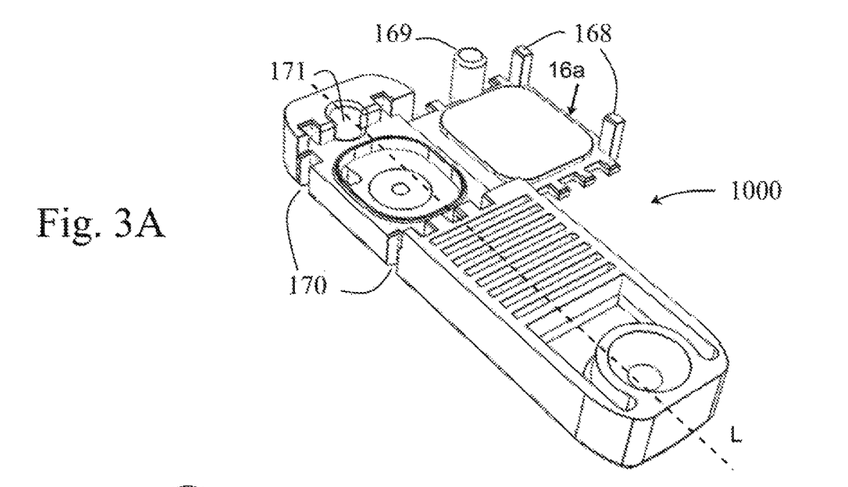
FIGS. 3A to 3C schematically show perspective bottom views and a partial top view of a drip emitter in accordance with yet another embodiment of the present invention in, respective, non-final and final assembly states.
Figure 3B:
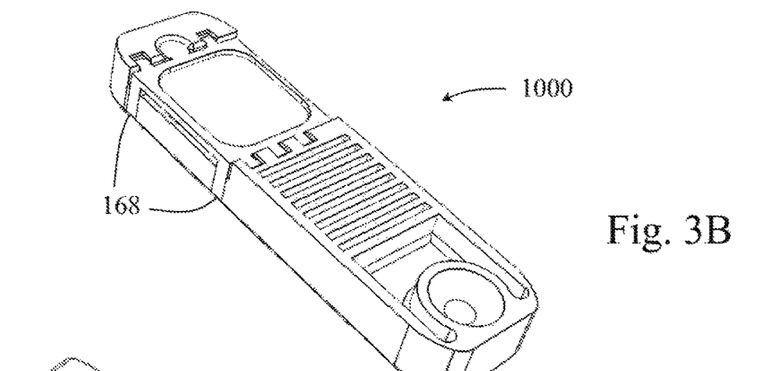
Figure 3C:
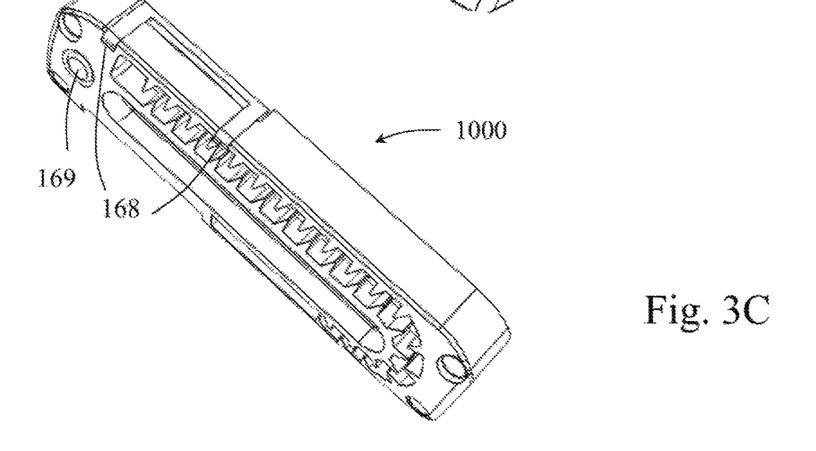

Attention is drawn to FIGS. 3A to 3C showing an embodiment of an emitter 1000 having a generally similar construction to emitter 10 or 100 and therefore similar parts are likewise numbered. Emitter 1000 mainly differs from emitter 100 in the configuration of the first retaining portion and the second retaining portion of its retaining means. Emitter 1000 includes, in its flap 14, an auxiliary upstanding pin 169, which may be wider than the upstanding closing pins 168. Emitter 100 also includes an auxiliary pin catch 171 in the form of a bore 171 formed through the emitter's body for receiving and engaging the auxiliary upstanding pin 169, when flap 14 is located above recess 26 and the emitter is in the operative assembled state. The bore 171 may be intersected by the longitudinal axis L. An end of upstanding central pin 169, similar to upstanding closing pins 168, is configured to be possibly flush with the emitter's outer side 13 to thereby bond to the pipe to assist in retaining flap 14 in its pressed position upon recess 26 during use of the emitter.

Figure 4:
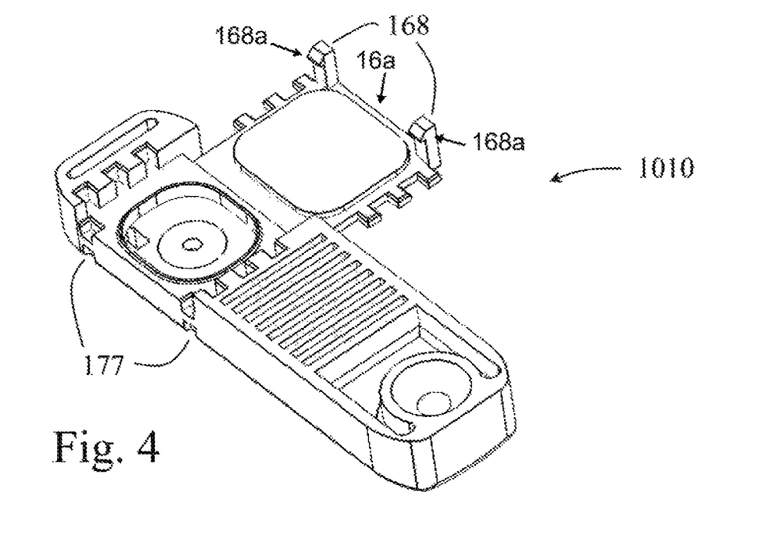
FIGS. 4 and 5 schematically show, respectively, perspective bottom and top views of a drip emitter in accordance with different embodiments of the present invention.

Attention is drawn to FIG. 4 showing an embodiment of an emitter 1010 having a generally similar construction to emitter 10, 100 or 1000 and therefore similar parts are likewise numbered. Emitter 1010 mainly differs from, e.g., emitter 100 in the configuration of the first retaining portion and the second retaining portion of its retaining means. On the flap, the ends of the upstanding closing pins 168 are provided with hooks 168a, while on the emitter body, the corresponding pin catches 177 are in the form of snap recesses 177. The hooks 168a and the snap recesses 177 provide the emitter 1010 with a snap configuration. This emitter's flap is thus configured to be retained in the position overlying recess 26 by snap engagement of the upstanding closing pins 168 in the snap recesses 177.

Figure 5:
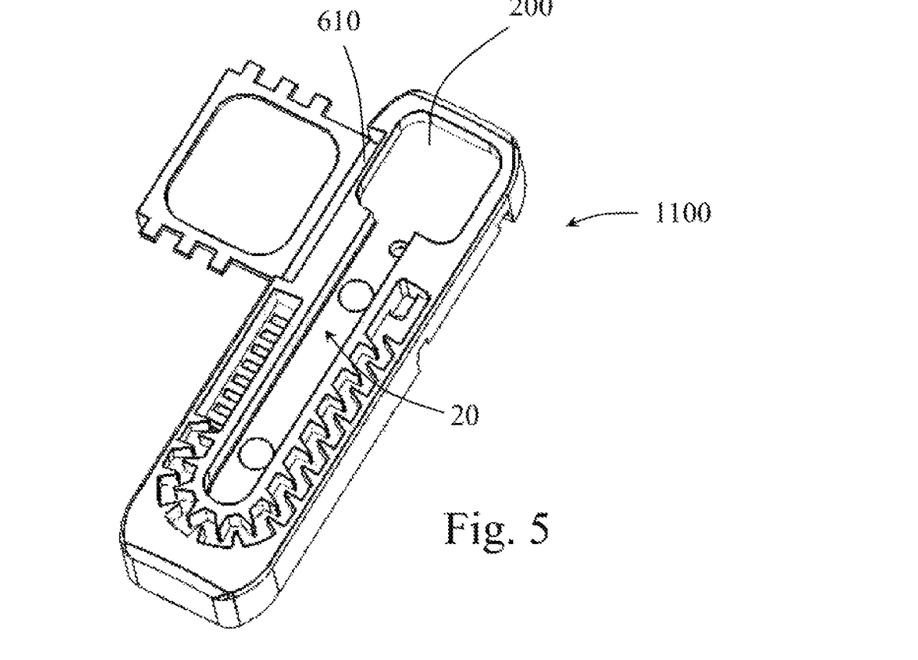

Attention is drawn to FIG. 5 showing an embodiment of an emitter 1100 exhibiting a version of exit pool 20 including a wider portion 200 adjacent one of the longitudinal ends of the emitter. Such wider portion 200 may provide further room for facilitating puncturing of the pipe (not shown) overlying the upper outer side of the emitter for providing a passage for liquid to the outside environment. The hinge of this emitter may comprise a depression 610 for thinning its thickness to assist in bending of the flap of this emitter relative to its body.

Attention is drawn to FIG. 6 schematically illustrating an embodiment of an emitter 1110 having a generally similar construction to emitter 10, 100, 1000 and/or 1010 and therefore similar parts are likewise numbered. The hinge of this emitter may comprise a depression 620 for thinning its thickness to assist in bending of the flap of this emitter relative to its body. Emitter 1100 also differs from, e.g., emitters 100, 1000 and 1010 in the configuration of the first retaining portion and the second retaining portion of its retaining means.

Emitter 1110 has a pinning arrangement including a male pinning arrangement 1601 on its flap 14 that is arranged to engage a female pinning arrangement 1602 on its body 12 for pinning both parts together after being rotated one towards the other about the hinge formed between the flap and body.

The male pinning arrangement 1601 includes an elongated aperture 90 extending through the frame 16 of the emitter. The elongated aperture 90 is located along the far side 16a of the frame that is distal to the hinge, and extends in a direction generally parallel to the longitudinal axis L of the emitter body. The upstanding closing pin 94 of male pinning arrangement 1601 is formed on an elongated bar 92 defined between the elongated aperture 90 and the far side 16*a* of the frame. The upstanding closing pin 94 is elongated in a direction along the longitudinal axis of the emitter body.

Figure 6A:
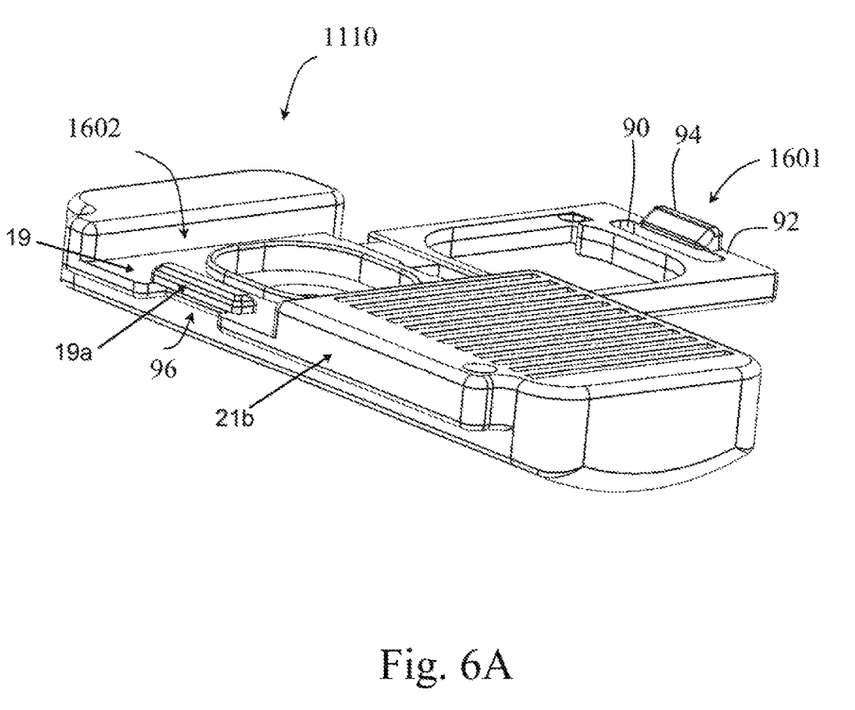

The female pinning arrangement 1602 includes an elongated protrusion 19*a* formed on the frame housing 19, adjacent the body emitter's second lateral side 21*b*. The female pinning arrangement 1602 also includes a pin catch 96 in the form of an undercut 96. As best seen in FIG. 6A, the undercut 96 may be located on the underside of the elongated protrusion 19*a*.

In the operative assembled state of the emitter (closed position of the flap 14), the elongated protrusion 19*a* occupies the elongated aperture 90 formed on the frame 14, and the elongated upstanding closing pin 94 engages the undercut 96 located on the underside of the elongated protrusion 19*a*.

In an aspect of the invention, the aperture 90 may create a so-called 'buffer' between the bar 92 and remainder of the frame 16 of the flap 14 that is used for securing the emitter's membrane therein. The aperture 90 has a width and length which provide the bar 92 with a flexible and resilient structure suitable for snap fitting the elongated upstanding closing pin 94 onto the undercut 96 of the female pinning arrangement 1602. This flexibility and resiliency also limits deformations occurring within bar 92 during such snap fitting from migrating towards the membrane, which may harm the sealing of the emitter's regulating chamber.

Emitter 1110 mainly differs from the former embodiments in its frame 16 being configured to include bays 32 where membrane 18 is also present. In the shown embodiment, emitter 1110 includes two such bays 32 however one or more than two bays can also be applicable in various embodiments. The bays 32 form indentations in an otherwise "smooth" periphery 160 of frame 16 as it surrounds and bounds membrane 18. Each bay 32 in other words may be defined as having a recess-like formation partly surrounded by the frame's periphery. In the shown example, as seen e.g. in the enlarged section at the top of FIG. 6, recess-like bay 32 may be surrounded by edges 1, here three edges, transverse one to the other (for example perpendicular one to the other) that open out to the remainder of the membrane 18 via a narrow entrance 2.

During injection molding, flow lines possibly at a cold front of an injected material filling a cavity in a mold may be formed. Such flow lines may create 'irregularities' in the form of, e.g., groovings and/or ripples that may be considered as defects in a molded part if they undermine the intended use of the part. For example, an area in a molded part that is designed to have a desired strength; may as a result of such 'irregularities' have a reduced strength than intended. In another example, an area in a molded part that is designed to have a certain flexibility; may as a result of such 'irregularities' have a different or inconsistent flexibility.

In an aspect of the invention, at least certain dripper embodiments of the invention may be designed to reduce likelihood of occurrence of such 'irregularities' in areas of the membrane that are intended to function for pressure regulation, since proper regulation normally depends, inter alia, on the resulting flexibility of the membrane in these areas.

Figure 7A:
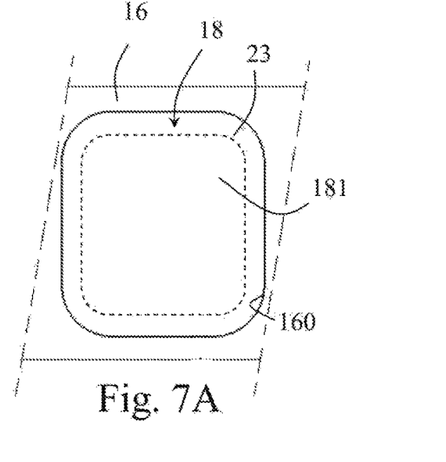
FIGS. 7A to 7E schematically show partial views of various emitter embodiments of the present invention.
Figure 7B:
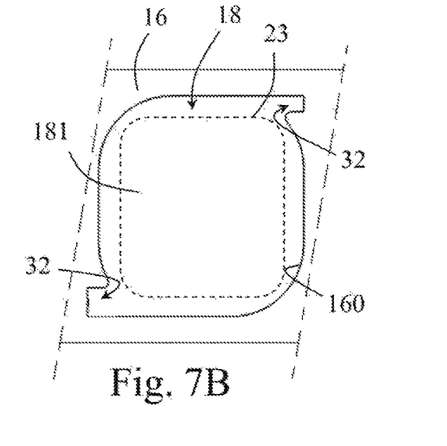

Attention is drawn to FIGS. 7A to 7E schematically illustrating partial views of various emitter embodiments; where each such figure shows a portion of an emitter including a membrane 18 and a frame 16. FIGS. 7A and 7C to 7E illustrate each an emitter embodiment with a frame that includes a "smooth" periphery 160 that surrounds and bounds membrane 18. This frame type periphery may be generally similar to those shown in FIGS. 1-5. In FIG. 7B, an emitter embodiment is shown with bays-like indentations 32 in an otherwise "smooth" periphery 160 of frame 16 as it surrounds and bounds membrane 18.

In each one of the FIGS. 7A to 7E, also an outline of a raised rim 23 of the respective emitter that is overlaid by membrane 18 is illustrated by the 'dashed-line'. Rim 23 encloses a substantially closed regulating chamber of the emitter in an assembled state where the emitter's flap is positioned to press the membrane 18 against the rim 23. In the emitters shown in FIGS. 7A to 7E, the above discussed 'irregularities' if occurring during injection molding of a membrane as part of the injection process of the emitter—may be designed to be in areas of the membrane that are substantially outside of a regulating part 181 of the membrane that is bound by the raised rim 23 in the provided views.

In the embodiment of FIG. 7B, the bays 32 may form 'buffer zones' for receiving such 'irregularities'. In an example, one of the bays may form a zone for accepting an injection nozzle that injects material of the membrane and the other bay may function as such 'buffer zone' where 'irregularities' that may be formed during the injection molding process of the membrane may be designed to end up.

In the embodiments of FIGS. 7A to 7E, existence of such 'buffer zones' may be provided in areas of the membrane outside of the membrane's regulating part 181, i.e. between the frame's periphery 160 and the membrane's regulating part 181. While the embodiment of FIG. 7B may "enjoy" a two-fold provision of such 'buffer zone'; a first in one or more of the bays 32, and a second in the area between the frame's periphery 160 and the membrane's regulating part 181—in the embodiments of FIGS. 7A and 7C to 7E such 'buffer zone' may be provided mainly in the area between the frame's periphery 160 and the membrane's regulating part 181.

Figure 7C:
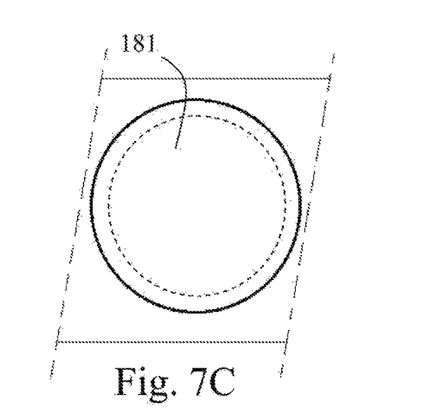
Figure 7D:
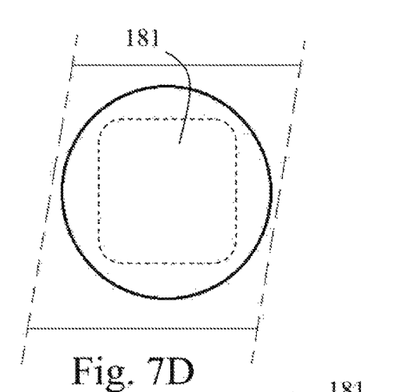
Figure 7E:
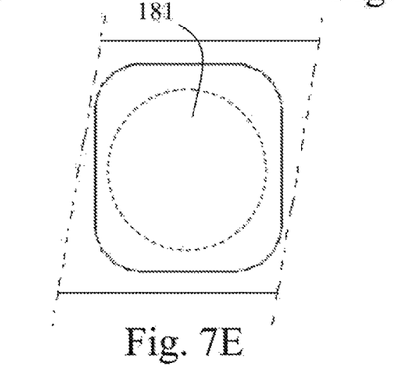

In FIG. 7A, an emitter embodiment is shown including a generally rectangular shaped periphery 160 and a generally rectangular shaped regulating part 181. In FIG. 7C, an emitter embodiment is shown including a generally circular shaped periphery 160 and a generally circular shaped regulating part 181. In FIG. 7D, an emitter embodiment is shown including a generally circular shaped periphery 160 and a generally rectangular shaped regulating part 181. In FIG. 7E, an emitter embodiment is shown including a generally rectangular shaped periphery 160 and a generally circular shaped regulating part 181.

In an aspect of the invention, in order to provide a sufficient 'buffer zone' for receiving 'irregularities' that may be formed during injection molding, a membrane of at least certain embodiments of the invention may preferably satisfy a relation of about $0.7 \leq A1/A2 \leq 0.95$. or preferably $0.7 \leq A1/A2 \leq 0.9$; where A1 is an area of a regulating part 181 of a membrane and A2 is an overall area of the same membrane bound by periphery 160.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Furthermore, while the present application or technology has been illustrated and described in detail in the drawings and foregoing description, such illustration and description are to be considered illustrative or exemplary and non-restrictive; the technology is thus not limited to the disclosed embodiments. Variations to the disclosed embodiments can be understood and effected by those skilled in the art and practicing the claimed technology, from a study of the drawings, the technology, and the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage.

The present technology is also understood to encompass the exact terms, features, numerical values or ranges etc., if in here such terms, features, numerical values or ranges etc. are referred to in connection with terms such as "about, ca., substantially, generally, at least" etc. In other words, "about 3" shall also comprise "3" or "substantially perpendicular" shall also comprise "perpendicular". Any reference signs in the claims should not be considered as limiting the scope.

Although the present embodiments have been described to a certain degree of particularity, it should be understood that various alterations and modifications could be made without departing from the scope of the invention as hereinafter claimed.

What is claimed is:

1. A drip emitter having a length extending along a longitudinal axis (L) thereof, and comprising:
    an emitter body comprising:
        an inner side having a recess formed therein;
        an outer side opposite the inner side and having an exit pool formed therein;
        first and second lateral sides connecting the inner and outer sides; and
        at least one pin catch formed closer to the emitter body's second lateral side than to the emitter body's first lateral side; and
    a flap connected to the body by a hinge along the emitter body's first lateral side and extending only part-way along the drip emitter's length, the flap comprising:
        a frame having a frame periphery;
        a flexible membrane within the frame; and
        at least one upstanding closing pin projecting in a direction perpendicular to the frame, and located at a far side of the frame that is distal to the hinge;
    wherein, when the flap is rotated about the hinge into an operative assembled state of the emitter:
        the membrane overlays the recess to form therewith a pressure regulating chamber of the emitter; and
        the at least one upstanding closing pin engages the at least one pin catch.

2. The drip emitter according to claim 1, comprising:
    a male pinning arrangement formed on the flap and including:
        an elongated aperture extending through the frame, the aperture extending along the far side of the frame that is distal to the hinge, and being elongated in a direction generally parallel to the emitter body longitudinal axis; and
        an elongated bar defined between the aperture and said far side of the frame, wherein:
            the upstanding closing pin is formed on the elongated bar, the upstanding closing pin being elongated in said direction along the longitudinal axis of the emitter body; and
    a female pinning arrangement formed closer to the second lateral side than to the first lateral side, and having:
        an elongated protrusion formed adjacent the second lateral side; wherein:
            the at least one pin catch is in the form of an undercut located on the underside of the elongated protrusion;
    wherein, in the operative assembled state of the emitter:
        the elongated protrusion occupies the elongated aperture formed on the frame; and
        the elongated upstanding closing pin engages the undercut located on the underside of the elongated protrusion.

3. The drip emitter according to claim 1, comprising:
    two upstanding closing pins projecting in said direction perpendicular to the frame, and located at a far side of the frame that is distal to hinge; and
    two pin catches in the form of two slits formed through the emitter body and opening out to both the emitter's inner side and the emitter's outer side;
    wherein, in the operative assembled state of the emitter:
        the two upstanding closing pins are received into the two slits.

4. The drip emitter according to claim 3, further comprising:
    an auxiliary upstanding pin formed on the frame, the auxiliary upstanding pin being wider than the upstanding closing pins; and
    an auxiliary pin catch in the form of bore formed through the emitter's body, the bore being intersected by the longitudinal axis,
    wherein, in the operative assembled state of the emitter:
        the bore receives engages the auxiliary upstanding pin.

5. The drip emitter according to claim 1, comprising:
    two upstanding closing pins projecting in said direction perpendicular to the frame, and located at a far side of the frame that is distal to hinge, ends of the two upstanding pins being provided with hooks; and
    two pin catches in the form of two snap recesses on the second lateral side of the emitter body;
    wherein, in the operative assembled state of the emitter:
        the two snap recesses engage the two hooks formed at the ends of the upstanding closing pins.

6. The drip emitter according to claim 1, wherein the hinge is a living hinge and is formed of the same material as the frame and the emitter body.

7. The drip emitter according to claim 6, wherein:
    the emitter body and frame both are formed of a first material; and
    the membrane is formed of a second material different from the first material.

8. The drip emitter according to claim 7, wherein:
    the emitter body and frame are formed from polyethylene; and
    the membrane is formed from a thermoplastic elastomer.

9. The drip emitter according to claim 7, wherein:
    the frame comprises a periphery bounding and surrounding the membrane; and
    the periphery comprises bays formed as indentations in an otherwise smooth periphery.

10. The drip emitter according to claim 7, wherein:
    the frame comprises a periphery bounding and surrounding the membrane;
    the membrane comprises a regulating part configured to overlay the recess to form the pressure regulating chamber of the emitter in the operative assembled state of the emitter; and an area A1 of the regulating part and an area A2 of the membrane bound within the periphery satisfies a relation of $0.7 \leq A1/A2 \leq 0.95$.

11. The drip emitter according to claim 1, wherein:
the frame comprises a periphery bounding and surrounding the membrane; and
the periphery comprises bays formed as indentations in an otherwise smooth periphery.

12. The drip emitter according to claim 1, wherein:
the frame comprises a periphery bounding and surrounding the membrane;
the membrane comprises a regulating part configured to overlay the recess to form the regulating chamber of the emitter in the operative assembled state of the emitter; and
an area A1 of the regulating part and an area A2 of the membrane bound within the periphery satisfies a relation of $0.7 \leq A1/A2 \leq 0.95$.

13. The drip emitter according to claim 1, wherein the hinge comprises a depression for thinning its thickness to assist in bending of the flap relative to body.

14. An irrigation pipe having a drip emitter in accordance with claim 1 bonded thereto, wherein:
the drip emitter's outer surface faces an inner surface of the irrigation pipe; and
an end of each upstanding closing pin is bonded to the pipe's inner surface during bonding of the emitter to the pipe to thereby assist in retaining the flap in the operative assembled state of the emitter.

15. A drip emitter having a longitudinal axis and comprising:
an emitter body comprising:
an inner side having a frame housing and a recess formed in the frame housing;
an outer side opposite the inner side and having an exit pool formed therein;
first and second lateral sides connecting the inner and outer sides; and
alternating projections and recesses formed in the frame housing on the inner side of the emitter body;
a flap connected to the body by a hinge along the emitter body's first lateral side, the flap comprising:
a frame having a frame periphery;
a flexible membrane within the frame; and
alternating projections and recesses formed along an outer periphery of the frame;
wherein, when the flap is rotated about the hinge into an operative assembled state of the emitter:
the membrane overlays the recess to form therewith a pressure regulating chamber of the emitter;
the alternating projections along the outer periphery of the frame engage the alternating recesses formed in the frame housing; and
the alternating recesses along the outer periphery of the frame engage the alternating projections formed in the frame housing.

16. The drip emitter according to claim 15, wherein:
the emitter body further comprises at least one pin catch formed closer to the emitter body's second lateral side than to the emitter body's first lateral side;
the flap further comprises at least one upstanding closing pin projecting in a direction perpendicular to the frame, and located at a far side of the frame that is distal to the hinge; and
in the operative assembled state of the emitter:
the at least one upstanding closing pin engages the at least one pin catch.

17. The drip emitter according to claim 16, comprising:
a male pinning arrangement formed on the flap and including:
an elongated aperture extending through the frame, the aperture extending along the far side of the frame that is distal to the hinge, and being elongated in a direction generally parallel to the emitter body longitudinal axis; and
an elongated bar defined between the aperture and said far side of the frame, wherein:
the upstanding closing pin is formed on the elongated bar, the upstanding closing pin being elongated in said direction along the longitudinal axis of the emitter body; and
a female pinning arrangement formed closer to the second lateral side than to the first lateral side, and having:
an elongated protrusion formed adjacent the second lateral side; wherein:
the at least one pin catch is the form of an undercut located on the underside of the elongated protrusion;
wherein, in the operative assembled state of the emitter:
the elongated protrusion occupies the elongated aperture formed on the frame; and
the elongated upstanding closing pin engages the undercut located on the underside of the elongated protrusion.

18. The drip emitter according to claim 16, comprising:
two upstanding closing pins projecting in said direction perpendicular to the frame, and located at a far side of the frame that is distal to hinge; and
two pin catches in the form of two slits formed through the emitter body and opening out to both the emitter's inner side and the emitter's outer side;
wherein, in the operative assembled state of the emitter:
the two upstanding closing pins are received into the two slits.

19. The drip emitter according to claim 18, further comprising:
an auxiliary upstanding pin formed on the frame, the auxiliary upstanding pin being wider than the upstanding closing pins; and
an auxiliary pin catch in the form of bore formed through the emitter's body, the bore being intersected by the longitudinal axis,
wherein, in the operative assembled state of the emitter:
the bore receives engages the auxiliary upstanding pin.

20. The drip emitter according to claim 16, comprising:
two upstanding closing pins projecting in said direction perpendicular to the frame, and located at a far side of the frame that is distal to hinge, ends of the two upstanding pins being provided with hooks; and
two pin catches in the form of two snap recesses on the second lateral side of the emitter body;
wherein, in the operative assembled state of the emitter:
the two snap recesses engage the two hooks formed at the ends of the upstanding closing pins.

21. A drip emitter having a length extending along a longitudinal axis (L) thereof, and comprising:
an emitter body comprising:
an inner side having a recess formed therein;
an outer side opposite the inner side and having an exit pool formed therein;
first and second lateral sides connecting the inner and outer sides;
a flap connected to the body by a hinge along the emitter body's first lateral side and extending only part-way along the drip emitter's length, the flap comprising:

a frame having a frame periphery;
a flexible membrane within the frame; and
retaining means for retaining the emitter body to the flap, the retaining means including a first retaining portion on the flap and a second retaining portion on the emitter body;
wherein, when the flap is rotated about the hinge into an operative assembled state of the emitter:
the membrane overlays the recess to form therewith a pressure regulating chamber of the emitter; and
the first retaining portion on the flap and the second retaining portion on the emitter body engage each other to retain the flap in a position overlaying the recess.

22. The drip emitter according to claim 21, wherein:
the first retaining portion on the flap comprises an upstanding closing pin projecting in a direction perpendicular to the frame; and
the second retaining portion on the emitter body comprises a pin catch.

23. The drip emitter according to claim 22, comprising:
a male pinning arrangement formed on the flap and including:
an elongated aperture extending through the frame, the aperture extending along the far side of the frame that is distal to the hinge, and being elongated in a direction generally parallel to the emitter body longitudinal axis; and
an elongated bar defined between the aperture and said far side of the frame, wherein:
the upstanding closing pin is formed on the elongated bar, the upstanding closing pin being elongated in said direction along the longitudinal axis of the emitter body; and
a female pinning arrangement formed closer to the second lateral side than to the first lateral side, and having:
an elongated protrusion formed adjacent the second lateral side; wherein:
the at least one pin catch is in the form of an undercut located on the underside of the elongated protrusion;
wherein, in the operative assembled state of the emitter:
the elongated protrusion occupies the elongated aperture formed on the frame; and
the elongated upstanding closing pin engages the undercut located on the underside of the elongated protrusion.

24. The drip emitter according to claim 22, comprising:
two upstanding closing pins projecting in said direction perpendicular to the frame, and located at a far side of the frame that is distal to hinge; and
two pin catches in the form of two slits formed through the emitter body and opening out to both the emitter's inner side and the emitter's outer side;
wherein, in the operative assembled state of the emitter:
the two upstanding closing pins are received into the two slits.

25. The drip emitter according to claim 24, further comprising:
an auxiliary upstanding pin formed on the frame, the auxiliary upstanding pin being wider than the upstanding closing pins; and
an auxiliary pin catch in the form of bore formed through the emitter's body, the bore being intersected by the longitudinal axis,
wherein, in the operative assembled state of the emitter:
the bore receives engages the auxiliary upstanding pin.

26. The drip emitter according to claim 22, comprising:
two upstanding closing pins projecting in said direction perpendicular to the frame, and located at a far side of the frame that is distal to hinge, ends of the two upstanding pins being provided with hooks; and
two pin catches in the form of two snap recesses on the second lateral side of the emitter body;
wherein, in the operative assembled state of the emitter:
the two snap recesses engage the two hooks formed at the ends of the upstanding closing pins.

27. A drip emitter having a length extending along a longitudinal axis (L) thereof, and comprising:
an emitter body comprising:
an inner side having a recess formed therein;
an outer side opposite the inner side and having an exit pool formed therein;
first and second lateral sides connecting the inner and outer sides; and
at least one pin catch formed closer to the emitter body's second lateral side than to the emitter body's first lateral side; and
a flap connected to the body by a hinge along the emitter body's first lateral side, the flap comprising:
a frame having a frame periphery;
a flexible membrane within the frame;
an elongated aperture extending through the frame, the elongated aperture being located along a far side of the frame that is distal to the hinge; and
an elongated bar comprising at least one elongated upstanding closing pin projecting in a direction perpendicular to the frame, the elongated bar being located between the elongated aperture and the far side of the frame;
wherein, when the flap is rotated about the hinge into an operative assembled state of the emitter:
the membrane overlays the recess to form therewith a pressure regulating chamber of the emitter; and
the at least one upstanding closing pin engages the at least one pin catch.

28. The drip emitter according to claim 27, wherein:
the elongated aperture is elongated in a direction along the longitudinal axis (L) of the emitter body;
the elongated closing pin is elongated in a direction along the longitudinal axis (L) of the emitter body; and
the elongated aperture is longer than the elongated closing pin, in said direction along the longitudinal axis (L) of the emitter body.

29. The drip emitter according to claim 27, further comprising:
an elongated protrusion formed along the emitter body's second lateral side; and
an undercut located on an underside of the elongated protrusion, the undercut comprising the at least pin catch.

30. The drip emitter according to claim 27, wherein:
the flap extends only part-way along the drip emitter's length.

31. The drip emitter according to claim 27, wherein:
the hinge is a living hinge and is formed of the same material as the frame and the emitter body;
the emitter body and frame both are formed of a first material; and
the membrane is formed of a second material different from the first material.

32. The drip emitter according to claim 31, wherein:
the emitter body and frame are formed from polyethylene; and
the membrane is formed from a thermoplastic elastomer.

33. The drip emitter according to claim 27, wherein:
the frame comprises a periphery bounding and surrounding the membrane; and
the periphery comprises bays formed as indentations in an otherwise smooth periphery.

34. The drip emitter according to claim 27, wherein:
the frame comprises a periphery bounding and surrounding the membrane;
the membrane comprises a regulating part configured to overlay the recess to form the pressure regulating chamber of the emitter in the operative assembled state of the emitter; and
an area A1 of the regulating part and an area A2 of the membrane bound within the periphery satisfies a relation of $0.7 \leq A1/A2 \leq 0.95$.

35. The drip emitter according to claim 27, wherein the hinge comprises a depression for thinning its thickness to assist in bending of the flap relative to body.

36. An irrigation pipe having a drip emitter in accordance with claim 27 bonded thereto, wherein:
the drip emitter's outer surface faces an inner surface of the irrigation pipe; and
an end of each upstanding closing pin is bonded to the pipe's inner surface during bonding of the emitter to the pipe to thereby assist in retaining the flap in the operative assembled state of the emitter.

\* \* \* \* \*